United States Patent [19]

Delaunay

[11] 4,448,288

[45] May 15, 1984

[54] DISC BRAKE

[75] Inventor: Jean Delaunay, Drancy, France

[73] Assignee: Societe Anonyme DBA, Paris, France

[21] Appl. No.: 317,089

[22] Filed: Nov. 2, 1981

[30] Foreign Application Priority Data

Nov. 13, 1980 [FR] France ................................ 80 24138

[51] Int. Cl.³ ........................................... F16D 65/02
[52] U.S. Cl. .................................. 188/73.45; 411/521; 411/533
[58] Field of Search ............... 188/73.34, 73.44, 73.45; 411/103, 109, 111, 112, 352, 353, 521, 522, 523, 533

[56] References Cited

U.S. PATENT DOCUMENTS

| | | | |
|---|---|---|---|
| Re. 30,255 | 4/1980 | Rath et al. | 188/73.45 |
| 2,492,115 | 12/1949 | Crowther | 411/353 |
| 2,761,484 | 5/1956 | Sternick | 151/69 |
| 2,922,456 | 1/1960 | Kann | 411/353 |
| 3,209,806 | 1/1965 | Currier | 151/69 |
| 3,244,212 | 6/1966 | Barry | 151/69 |
| 3,343,581 | 1/1967 | Martin | 151/69 |
| 3,917,033 | 7/1975 | Rath | 188/73.3 |
| 4,236,562 | 12/1980 | Molina | 411/103 X |

FOREIGN PATENT DOCUMENTS 1594263 7/1970 France .
2030190 10/1970 France .
2037385 7/1980 United Kingdom ............ 188/73.45

Primary Examiner—George E. A. Halvosa
Attorney, Agent, or Firm—Paul David Schoenle; Ken C. Decker

[57] ABSTRACT

The invention proposes a disc brake having a caliper (14) slidably mounted on a fixed support (10) by at least one axial column (16) slidingly received in an open bore (58) in the caliper (14). The brake is characterized in that the column (16) includes an axial abutment associated with the sleeve (40) in order to limit the axial displacements of the latter with respect to the caliper (14) when the stem (46) of the bolt (42) is unscrewed from the fixed support (10). The abutment (86) consists of a crown (70) of U-shaped cross-section the inner cylindrical sidewall (72) of which is mounted in the bore (43) inside the sleeve (40) and the flat annular end (76) of which is held tight between the end (52) of the sleeve and the fixed support (10) when the column (16) is fixed to the latter, the abutment surface (86) consisting of the extreme free edge of the outer cylindrical sidewall (74) of the crown (70).

5 Claims, 5 Drawing Figures

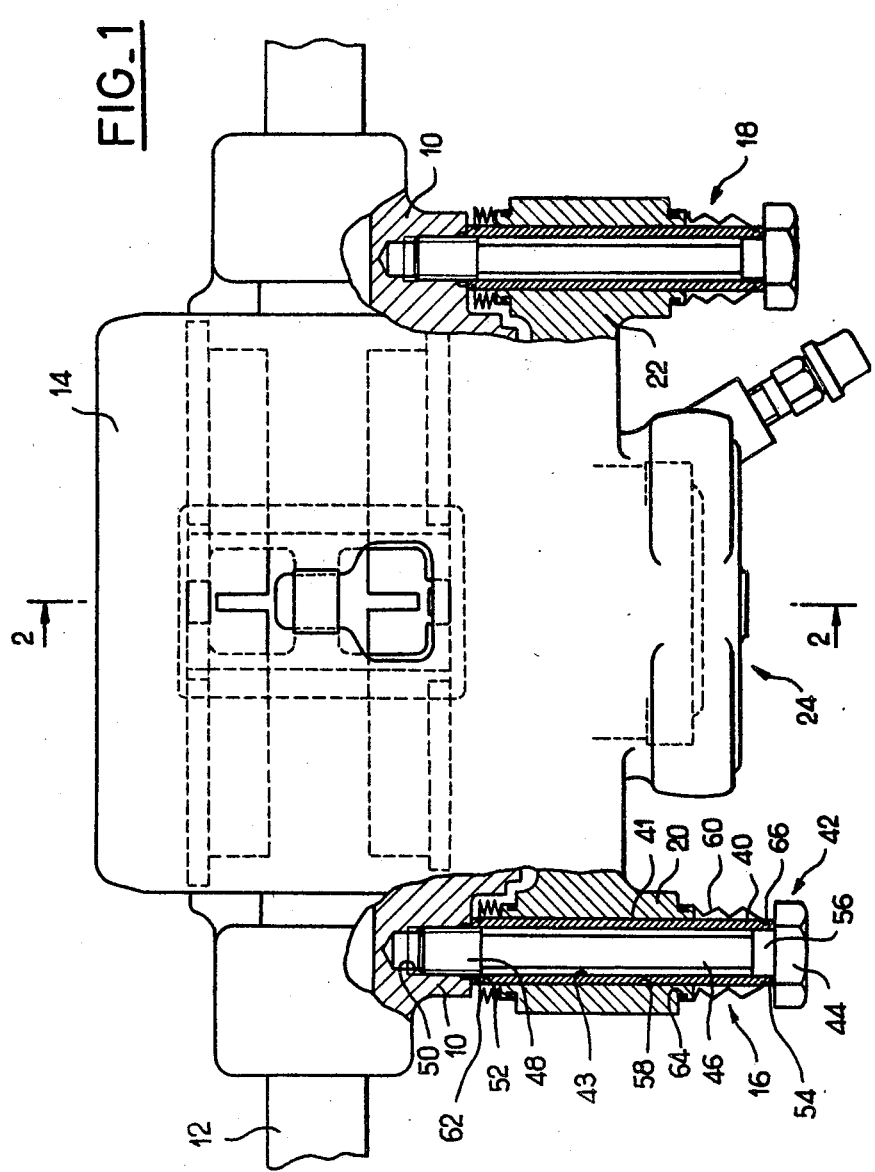

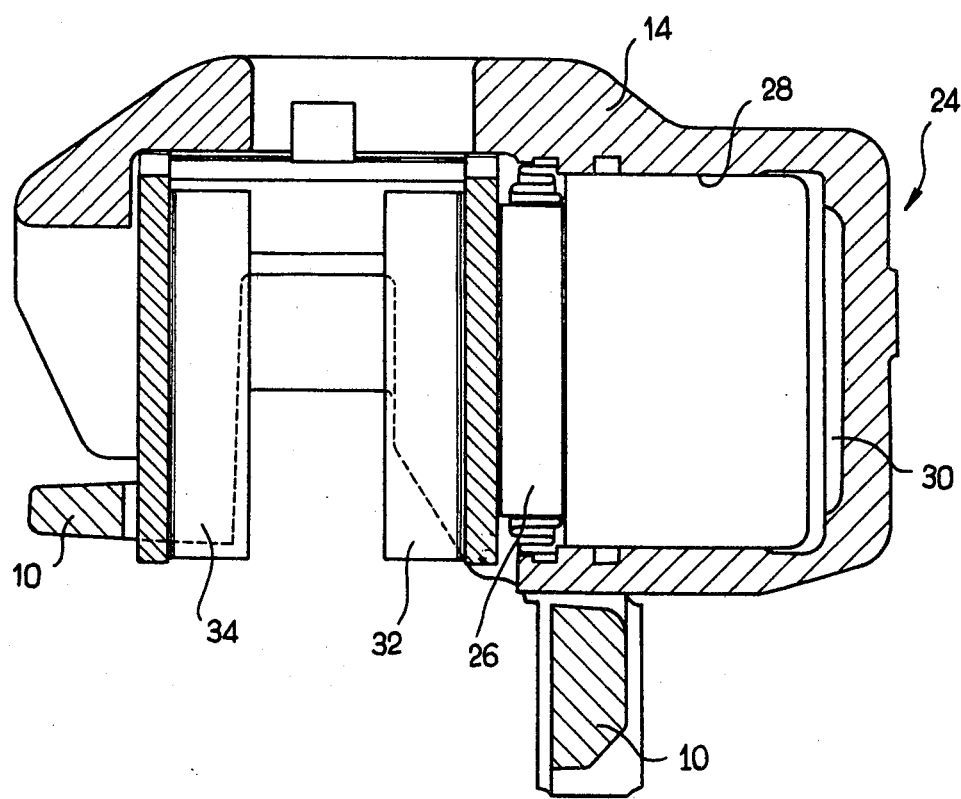
FIG_2

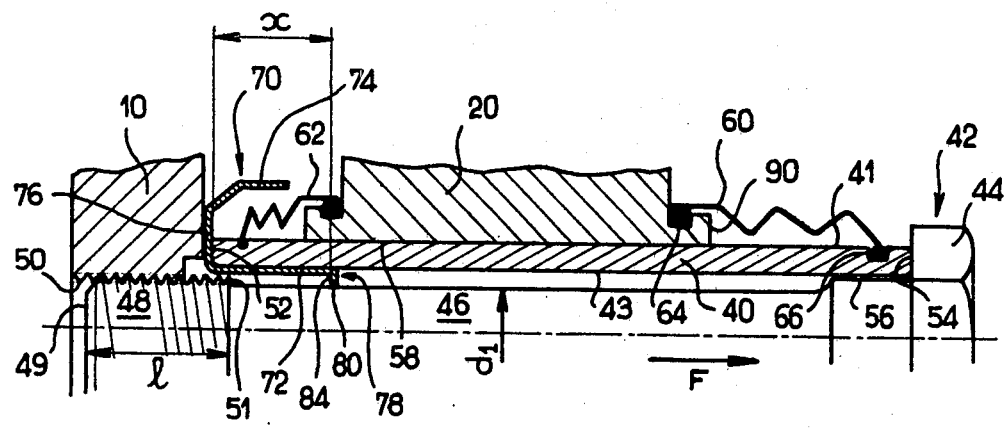
FIG_3a
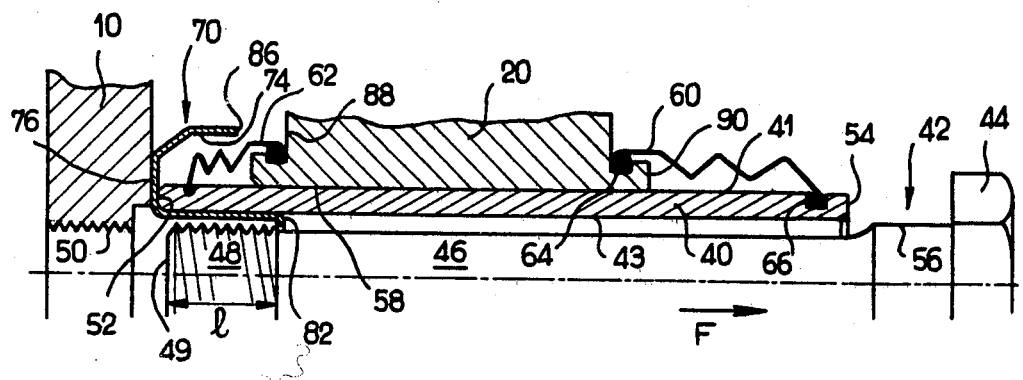
FIG_3b
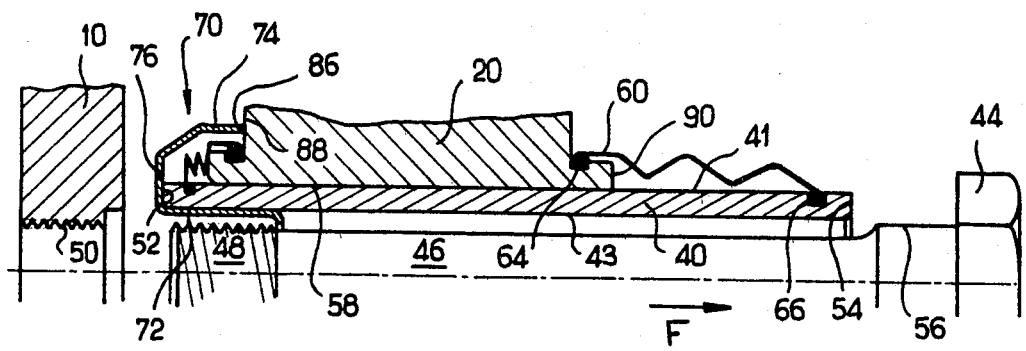
FIG_3c

DISC BRAKE

The object of the invention is a disc brake having a caliper slidably mounted on a fixed support by means of at least one axial column.

The French patent application No. 70-02452 published under No. 2 030 190 proposes a disc brake, the caliper of which is mounted to slide on a fixed support by means of at least one axial column slidingly received in a corresponding bore in the caliper. In this brake the colum consists of a cylindrical sleeve fixed to the fixed support by means of a bolt which is introduced into the bore inside the sleeve and the threaded end of which is screwed into a tapped hole in the fixed support so as to hold the sleeve tight between the fixed support and the head of the bolt. The zone of sliding between the caliper and the fixed support, consisting of the cooperation between the bore formed in the caliper and the outer surface of the cylindrical sleeve is protected by means of two rubber bellows the ends of which are attached on the one hand to the caliper and on the other to the sleeve.

In this type of brake when it is desired to proceed to dismounting of the caliper in order, for example, to replace the worn friction members, the bolt must be unscrewed from the column in order to loosen the latter from the fixed support in order to allow tilting or removal of the caliper. During this operation it sometimes happens that the protective bellows are accidentally damaged, especially when a too great axial pull is exerted upon the sliding sleeve in the direction corresponding to the withdrawal of the bolt. Again, once the bolt has been unscrewed from the fixed support it can freely escape from the sleeve. It will be understood that upon re-assembly of the brake it is then necessary to reintroduce the bolt into the sleeve in order to be able to screw it again into the fixed support; this operation often proves to be complicated in view of the small space generally available for carrying out repairs upon friction members.

The object of the invention is to propose a disc brake which avoids the drawbacks mentioned above.

To this end, the invention proposes a disc brake of the type described above, characterized in that the column includes means of axial abutment associated with said sleeve in order to limit the axial displacements of the latter with respect to the caliper when the stem of said bolt is unscrewed from the fixed support.

In the preferred embodiment, the means of abutment consist of a crown of U-shaped cross-section the inner cylindrical sidewall of which is mounted in the bore inside the sleeve and the flat annular end of which is held tight between the end of the sleeve and the fixed support when the axial column is fixed to the latter, the abutment surface consisting of the extreme free edge of the outer cylindrical sidewall of the crown. The inner cylindrical sidewall of the crown is provided with a threaded internal radial shoulder the nominal diameter of which is equal to the nominal diameter of the thread formed on the threaded end of the bolt.

A preferred embodiment of the invention will now be described by way of example by referring to the attached drawings in which:

FIG. 1 represents a disc brake having a caliper slidably mounted by means of two axial columns, of a type known from the prior art;

FIG. 2 is a cross sectional view taken along the line 2—2 of FIG. 1; and

FIGS. 3a, 3b, 3c represent a preferred embodiment of the axial sliding columns in accordance with the present invention.

The disc brake represented in FIGS. 1 and 2 includes a fixed support member 10 provided in order to be associated with a fixed portion of a vehicle (not shown) and consisting in the represented embodiment, of a member arranged in the vicinity of a disc 12 provided in order to be coupled in rotation with a wheel of the vehicle (not shown). The fixed support 10 by means of two spaced circumferentially axial columns 16 and 18 holds with sliding freedom a movable caliper 14 which straddles the disc. The axes of the columns 16 and 18 are substantially parallel with the axis of rotation of the disc 12. The columns 16 and 18 are arranged between the fixed support 10 and arms 20 and 22 of the caliper 14. The caliper 14 includes actuating means 24, which consist of a hydraulic brake motor comprising a piston 26 slidably mounted in a bore 28 formed in the caliper 14 and sensitive to the pressure prevailing in an operating chamber 30 capable of being connected to a source of pressure such, for example, as the master cylinder of the vehicle. The piston 26 is arranged so as to trhust a first friction member 32 directly against a first face of the disc 12 when the fluid under pressure is admitted into the chamber 30. Under the effect of this thrust the caliper 14 is displaced by reaction and slides along the columns 16 and 18 in order to thrust a second friction member 34 against the other face of the disc 12. In the illustrated embodiment, the firction members 32 and 34 are held anchored but with sliding freedom in the circumferentially spaced edges of an opening (not shown) formed in the fixed support 10.

The axial sliding columns 16 and 18 are, in the brake represented in FIG. 1, of an identical type and only the column 16 will now be described in detail. The column 16 consists of a cylindrical sleeve 40 which is fixed to the fixed support 10 by means of a bolt 42 held in the bore 43 inside the cylindrical sleeve 40. The bolt 42 comprises a head 44 and a stem 46 the treaded end 48 of which is mounted by screwing into a tapped hole 50 formed in the fixed support 10. Thanks to the bolt 42 the cylindrical sleeve 40 is held tight between the fixed support 10 against which it bears by a first one of its ends 52, and the head of the bolt 44 against which it bears by the second of its ends 54. One portion 56 of the stem 46 of the bolt 44 has a diameter substantially equal to the inner diameter of the bore 43 inside the cylindrical sleeve 43 in order to ensure good coaxiality between the bolt 42 and the cylindrical sleeve 40. The cylindrical sleeve 40 is held with sliding freedom in a corresponding open bore 58 formed in the arm 20 of the caliper 14. The zone of sliding formed between the outer cylindrical surface 41 of the sleeve 40 and the surface of the open bore 58 is protected by means of two protective bellows of rubber 60 and 62. The bellows 60 and 62 are attached in an identical way, on the one hand in a groove 64 formed in the arm 20 of the caliper 14 and on the other hand in a groove 66 formed at the end of the sliding sleeve 40.

In FIGS. 3a, 3b, 3c, the column 16 is shown equipped with improvements which are objects of the present invention. In accordance with the present invention the column 16 is equipped with means of axial abutment associated with the sleeve 40 in order to limit the axial displacements of the latter with respect to the arm of the caliper 14 when the stem 46 of the bolt 42 is unscrewed from the fixed support, in order to avoid damaging the protective bellows 60 and 62. In the illustrated embodiment, the means of axial abutment consists of a part or crown 70. The crown 70 is a crown of revolution which is substantially coaxial with the main axis of the column 16 and which exhibits in cross-section in a plane containing the axis of the crown, substantially the shape of a U. The crown 70 is composed of an inner cylindircal sidewall 72, an outer cylindrical sidewall 74 coaxial with the inner cylindrical side wall 72 and a flat annular end 76 which connects the sidewalls 72 and 74. The colum 16 is shown in FIG. 3a in its assembled position attached to the fixed support 10. In this position the inner cylindrical sidewall 72 of the crown 70 is mounted in the bore 43 inside the cylindrical sleeve 40 and the flat annular end 76 is held tight between the end edge 52 of the cylindrical sleeve and the fixed support 10 by means of the bolt 42. The inner sidewall 72 is equipped with an internal radial shoulder 78, consisting of a transverse annular flange which extends from the inner cylindrical sidewall 72. The circular opening 80 defined by the internal radial shoulder 78 is threaded and the nominal diameter of the thread thus formed on the internal shoulder 78 is equal to the nominal diameter of the thread on the threaded end 48 of the stem 46 of the bolt 42. The inner cylindrical sidewall 72 of the crwon 70 is tightly mounted without play or clearance in the bore 43 inside the cylindrical sleeve 40, as shown in FIGS. 3a–3c. As may be noted, in particular from FIG. 3a, the diameter $d_1$ of the non-threaded portion of the stem 46 of the bolt 42 is less than the nominal diameter of the thread on the threaded end 48 of the stem 46.

When someone wishes to carry out the assembly of the column 16 and its attachment to the fixed support 10, he introduces the sleeve 40 equipped with the crown 70 into the open bore 58 in the arm 20 of the caliper and then puts in place the bellows 60 and 62 in the grooves 64 and 66 formed respectively in the arm 20 and the sleeve 40. When these operations have been carried out, he introduces the bolt 42 into the bore 43 inside the cylindrical sleeve 40 until the end face 49 of the threaded end 48 of the stem 46 of the bolt 42 comes into contact with the end face 82 of the internal radial shoulder 78 on the crown 70; in this position he screws the threaded end 48 of the bolt 42 into the threaded circular opening 80 in the shoulder 78 until the whole of the threaded portion 48 has passed beyond the internal radial shoulder 78. Thanks to the latter characteristic, the bolt 42 can then be advanced in the direction of the fixed support until it is possible to screw the end 48 into the tapped hole 50 in the fixed support 10 in order to hold the cylindrical sleeve 40 and the crown 70 tightly compressed between the fixed support 10 and the head of the bolt 44.

When a mechanic wishes in order, for example, to proceed with replacement of friction members, to dismount the columns 16 and 18 he starts by unscrewing the threaded end 48 from the tapped hole 50 in which it is mounted. He then moves the stem of the bolt towards the right (as seen in the Figures) until the side edges 51, bounding the threaded portion 48 of the stem 46 of the bolt 42, comes into abutment against the second end face 84 of the internal radial shoulder on the crown 70. The bolt then occupies the position shown in FIG. 3b. In accordance with one characteristic of the invention, the length "l" of the threaded portion 48 of the stem 46 of the bolt 42 is less than the distance "x" which separates the end 52 of the cylindrical sleeve 40 from the end face 84 of the shoulder 78 facing the fixed support 10. Thanks to this characteristic it is found that in the position occupied in FIG. 3b the end face 49 of the stem of the bolt 42 is completely retracted behind the end 52 of the cylindrical sleeve 40 and the annular wall 76 of the crown 70. The mechanic can then if he wishes, tilt the caliper about the column which has not yet been dismounted. If the mechanic continues to exert an axial pull in the direction indicated in the figures by the arrow F, the cylindrical sleeve 40 moves in the direction indicated by the arrow F, taking along with it the crown 70 until the extreme free edge 86 of the outer sidewall 74 of the crown 70 comes into abutment against the surface 88 formed opposite it on the arm 20 of the caliper 14, and thus occupies the position represented in FIG. 3c. In this new position the crown 70 forms a means of axial abutment associated with the sleeve 40 in order to prevent any additional axial movement of the sleeve 40 with respect to the caliper 14 in the direction indicated by the arrow F. In short it is found that any additional axial pull in the direction F exerted upon the bolt 42 or upon the sleeve 40 is opposed, the crown 70 opposing any axial movement of the sleeve with respect to the caliper via the abutment at 86 and the tight fit of the crown and sleeve, while the crown 70 opposes axial movement of the bolt via the interference between the face 84 and threads 48, and that thus any damage or tearing of the bellow 62 is rendered impossible. It will likewise be understood that thanks to the threaded internal radial shoulder 78, dropping or accidental loosing of the bolt 42 is impossible, the latter being held in the bore 43 inside the sleeve 40 thanks to the cooperation between the end face 84 of the internal radial shoulder 78 and the edge 51 bounding the threaded portion of the stem of the bolt 42. Nevertheless, if the mechanic wishes to dismount the bolt 42 completely he must unscrew it until the internal radial shoulder 78 disengages itself completely from the threaded portion 48 of the stem 46 of the bolt 42. For this purpose and in accordance with one additional characteristic of the present invention, the axial length of the radial shoulder 78, that is to say, the distance which separates the two end faces 82 and 84, is less than the length of the sleeve 40.

In the embodiment shown the crown 70 is produced from stamped sheetmetal, the threaded internal radial shoulder 78 is limited to a transverse annular flange in one with the material of the groove 66, the thread on this internal shoulder consisting of a single thread formed by the thickness of the stamped sheetmetal which corresponds substantially with the bottom of the thread of the threaded portion of the stem 46 of the bolt 42.

I claim:

1. A disc brake having a caliper slidably mounted on a fixed support by means of at least one axial column slidingly received in an open bore formed in the caliper, said axial column comprising a cylindrical sleeve fixed to said fixed support by means of a bolt the stem of which is held in a bore inside the cylindrical sleeve and the threaded end of which is screwed into a hole tapped in said fixed support so as to hold the sleeve tight between the fixed support and the head of the bolt, protective bellows being mounted between said sleeve and the caliper on opposite sides of the latter, characterized in that the said column includes means of axial abutment associated with said sleeve in order to limit the axial displacements of the latter with respect to said caliper when the stem of said bolt is unscrewed from the fixed support said means of abutment include an abutment surface capable of coming to bear against a corresponding surface formed on the caliper when said sleeve is acted upon by an axial pull in the direction corresponding to the withdrawal of the said bolt, said means of abutment consist of a crown of U-shaped cross-section having an inner cylindrical sidewall which is mounted in the bore inside said sleeve and a flat annular end which is held tight between the end of the sleeve and the fixed support when said column is fixed to the latter, said abutment surface consisting of an extreme free edge of the outer cylindrical sidewall of said crown.

2. A disc brake according to claim 1, characterized in that said inner cylindrical sidewall (72) of the crown is equipped with a threaded internal radial shoulder (78) the nominal diameter of which is equal to the nominal diameter of the thread on the threaded end (48) of the bolt (42).

3. A disc brake according to claim 2, characterized in that said internal radial shoulder (78) has an axial length less than the length of the sleeve and bounded by the two end faces (82, 84) of the said shoulder (78), the non-threaded portion of the stem of the bolt being of a diameter ($d_1$) less than the said nominal diameter of the threaded end (48) of the stem of the bolt (42).

4. A disc brake according to claim 3, characterized in that the length ("1") of the threaded portion (48) of the stem (46) of the bolt (42) screwed into the tapped hole (50) is less than the distance ("x") which separates the end face (84) of the shoulder (78) facing the fixed support (10) from the end (52) of said sleeve (40) bearing against the fixed support (10).

5. A disc brake according to any of the claims 1 to 4, characterized in that said crown (70) is produced from stamped sheetmetal.

* * * * *